United States Patent [19]
Hahn

[11] 3,918,393
[45] Nov. 11, 1975

[54] METHOD OF PRODUCING FLAT (NON-GLOSSY) FILMS
[75] Inventor: Ernest A. Hahn, Plainfield, Ill.
[73] Assignee: PPG Industries, Inc., Pittsburgh, Pa.
[22] Filed: Sept. 10, 1971
[21] Appl. No.: 179,564

[52] U.S. Cl. .................. 427/38; 427/53; 427/44; 427/54; 204/159.16; 204/159.19
[51] Int. Cl. ......... B44d 1/50; C08f 3/42; C08f 3/50
[58] Field of Search ...... 117/93.31, 161 UC, 161 K, 117/62, 64 R; 204/159.14, 159.16, 159.19; 96/35.1, 115 P; 264/22

[56] References Cited
UNITED STATES PATENTS
2,914,450  11/1959  Hammesfahr et al. ........... 117/93.31
3,241,973   3/1966  Thommes ........................... 96/35.1
3,330,748   7/1967  Lawton ............................ 204/159.14
3,531,317   9/1970  Patheiger et al. ............... 117/93.31
3,565,780   2/1971  Zimmerman ..................... 117/93.31

Primary Examiner—William D. Martin
Assistant Examiner—John H. Newsome
Attorney, Agent, or Firm—George D. Morris

[57] ABSTRACT

A flat film or coating is prepared by subjecting a substantially solventless, actinic light, or radiation-sensitive material to ionizing irradiation or actinic light in an oxygen-containing atmosphere and subsequently subjecting the material to ionizing irradiation or actinic light in an inert gas or an atmosphere containing less than about 1000 parts per million of oxygen. The preferred films or coatings are prepared from polyacrylates or unsaturated polyester resins.

15 Claims, No Drawings

METHOD OF PRODUCING FLAT (NON-GLOSSY) FILMS

A method of forming films and coatings having heat and wear-resistance, stain-resistance, and other properties achievable only by extensive crosslinking is that of subjecting radiation-sensitive materials such as polyacrylates and unsaturated polyester resins to ionizing irradiation or actinic light to cure the materials. The method of irradiating to cure is advantageous as the degree of crosslinking achieved thereby is unobtainable by many other methods.

It has been found, however, that the ionizing irradiation treatment or actinic light treatment of radiation-sensitive materials results in glossy films. This is desirable in some cases but in many cases it is necessary to achieve a film or coating having good physical properties which is flat (has a very low gloss). In many cases a gloss of only about 20 percent or less is desired.

It has now been discovered that a strong film or coating may be achieved with a flattened effect (low gloss) by first subjecting a radiation-sensitive material to ionizing irradiation or actinic light in an atmosphere containing at least about 5,000 parts per million of oxygen or more and subsequently subjecting the material to ionizing irradiation in an inert atmosphere containing less than about 1000 parts per million of oxygen.

The radiation-sensitive material to be subjected to ionizing irradiation or actinic light may be any substantially solventless actinic light or irradiation-sensitive, curable, organic material. The most useful organic materials to be used are polyester resins and acrylic resins and monomers. While solvents are not necessary for this flatting effect they may be used to produce other properties.

The polyester resins comprise unsaturated polyesters, solubilized in vinyl monomers. The unsaturated polyesters are ordinarily mixtures of alpha-beta ethylenically unsaturated polycarboxylic acids and polyhydric alcohols.

The ethylenically unsaturated polycarboxylic acids include such acids as:
  maleic acid
  fumaric acid
  aconitic acid
  mesaconic acid
  citraconic acid
  itaconic acid and halo and alkyl derivatives of such acids and the like; the preferred acid being maleic acid. The anhydrides of these acids, where the anhydrides exist, are, of course, embraced under the term "acid", since the polyesters obtained therefrom are essentially the same whether the acid or anhydride is utilized in the reaction. The ethylenically unsaturated dicarboxylic acids are conventionally employed in an amount of about 10 mol percent to about 100 mol percent, although preferably in an amount of about 20 mol percent to about 80 mol percent of the total mols of acid component in the polyester.

The polyhydric alcohols useful in preparing unsaturated polyesters include:
  ethylene glycol
  diethylene glycol
  triethylene glycol
  polyethylene glycol
  propylene glycol
  dipropylene glycol
  polypropylene glycol
  glycerol
  neopentyl glycol
  pentaerythritol
  trimethylol propane
  trimethylol ethane and the like. The preferred polyols for the purposes of this invention have a molecular weight of less than about 2000 and consist essentially of carbon, hydrogen and oxygen. The polyhydric alcohols are generally employed in an equal molar ratio to the total acid components, or as a slight excess, as, for example, about 5 mol percent excess.

Saturated dicarboxylic acids may be utilized in combination with the unsaturated acid or anhydride in the preparation of unsaturated polyesters. Such acids increase the length of the polyester without adding additional crosslinking sites, which is a desired feature in some polyesters. Examples of useful dicarboxylic acids which are either saturated or only aromatically unsaturated include:
  succinic acid
  adipic acid
  suberic acid
  azelaic acid
  sebacic acid
  phthalic acid
  orthophthalic acid
  isophthalic acid
  hexahydrophthalic acid
  terephthalic acid
  tetrachlorophthalic acid and the like. As in the case of the ethylenically unsaturated acids, the anhydrides of these acids, where the anhydrides exist, are, of course, embraced in the term "acid", since the polyesters obtained therefrom are the same. Furthermore, for purposes of the present invention, the aromatic nuclei of such acids as phthalic acid are generally regarded as saturated since the double bonds do not react by addition, as do ethylenic groups. Therefore, wherever the term "saturated dicarboxylic acid" is utilized, it is to be understood that such term includes the aromatically unsaturated dicarboxylic acids. Such "saturated carboxylic acids" may also be referred to as "non-olefinically unsaturated" polycarboxylic acids.

Vinyl monomers which crosslink with unsaturated polyesters to form thermosetting materials may be interpolymerized with the acrylic compounds and polyesters, if desired. Such vinyl monomers may include:
  styrene
  alpha-methylstyrene
  divinylbenzene
  diallyl phthalate
  methyl acrylate
  methyl methacrylate
  hexyl acrylate
  octyl acrylate
  octyl methacrylate
  diallyl itaconate
  diallyl maleate and the like. The preferred vinyl monomers are liquid compounds, soluble in the polyester components. Such monomers should preferably be free of non-aromatic carbon-carbon conjugated double bonds.

The vinyl monomer as exemplified in the above list may be employed over a broad range, but usually the proportion thereof, upon a weight basis, will be less than the polyester component. The amount of monomer should be sufficient to provide a liquid, flowable, interpolymerizable mixture. Ordinarily, the percentage of monomer will fall within the range of about 10 percent to about 60 percent by weight of the total mixture of polyester and monomer.

The preferred polyester resins are those formed from polyesters of propylene glycol or neopentyl glycol as the diol and maleic acid and isophthalic acid as the carboxylic acids with styrene or vinyl toluene as the solubilizing monomer.

The acrylic compositions which may be used as the radiation-sensitive materials in this invention may be esters or amides of acrylic or methacrylic acid or co-monomers of such an ester with another copolymerizable monomer. Preferred esters include those of alcohols containing one to eight carbon atoms such as methyl acrylate, methyl methacrylate, ethyl acrylate, butyl methacrylate, octyl acrylate and 2-ethoxy ethyl methacrylate. Suitable amides include acrylamide, methacrylamide, tertiary butyl acrylamide and primary alkyl acrylamides. Mixtures of such esters or amides may be copolymerized or one or more of the esters may be copolymerized with a higher alkyl ester or amide of acrylic or methacrylic acid or with another monomer containing a copolymerizable vinyl group, for example, itaconate esters, maleate esters and allyl compounds, alkylene dimethacrylates and diacrylates, such as 1,3-butylene dimethacrylate, and the like, and triacrylates and trimethacrylates, such as trimethyl propane trimethacrylate, and the like, may also be used. The preferred acrylates are polyacrylates and methacrylates, such as di- acrylates, di- methacrylates, tri- acrylates, tri- methacrylates, and the like, such as acryloxy pivalyl acryloxy pivalate, described in copending U.S. patent application Ser. No. 827,974, filed May 26, 1969, now U.S. Pat. No. 3,647,737, hexahydrophthalic ethylene glycol diacrylate, phthalic ethylene glycol diacrylate and the like. Examples of these materials are found in U.S. Pat. No. 3,455,802.

The radiation-sensitive materials may also contain other materials such as dyes, fillers, and the like. In the preferred embodiment, the materials contain flatting pigments such as silica, polyethylene, talc, clay and the like. Although there is a noticeable decrease in gloss using the process of this invention, if no pigments are present, the effect is significantly enhanced with the addition of these pigments. It is desirable to use compositions containing from about 3 percent to about 15 percent by weight of these flatting pigments.

It is noted that if the cure in inert gas or in an atmosphere containing 250 parts per million of oxygen or less is actinic light, the flatting effect will not take place if significant amounts of specific pigments are present. Hence, if the second cure is actinic light, it is preferred to use clear or pigmentless coatings.

The addition of acrylic monomers such as 2-ethyl hexyl acrylate, butyl acrylate and the like may also be desired as these monomers also tend to lower the gloss of the coatings. These monomers preferably comprise from about 5 to about 25 percent by weight of the composition.

The coating composition may contain photosensitizers to aid in the actinic light treatment. Various common photosensitizers are benzoin, benzoin methyl ether, diphenyl disulfide, dibenzyl disulfide, benzil and the like. Generally, the coating may comprise from about 0.1 percent by weight of the photosensitizer to about 5 percent by weight of the photosensitizer.

The above materials are first subjected to ionizing irradiation or actinic light in oxygen-containing atmosphere.

The term "ionizing irradiation", as used herein, means high energy radiation and/or the secondary energies resulting from conversion of electrons or other particle energy to X-rays or gamma radiation. While various types of irradiation are suitable for this purpose, such as X-ray and gamma rays, the radiation produced by accelerated high energy electrons has been found to be very conveniently and economically applicable and to give very satisfactory results. However, regardless of the type of radiation and the type of equipment used for its generation or application, the use thereof in the practice of the invention as described herein is contemplated as falling within the scope of this invention so long as the ionization radiation is equivalent to at least about 100,000 electron volts.

While there is no upper limit to the electron energy that can be so applied advantageously, the effects desired in the practice of this invention can be accomplished without having to go to above about 20,000,000 electron volts. Generally, the higher the electron energy used, the greater is the depth of penetration into the massive structure of the materials to be treated. For other types of radiation, such as gamma and X-rays, energy systems equivalent to the above range of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation".

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van der Graaff generators, betatrons, synchrotons, cyclotrons, etc. Neutron radiation can be produced by bombarding a selected light metal such as beryllium with positive particles of high energy. Particle radiation can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to irradiation of this type, commonly called X-ray, an ionizing electromagnetic irradiation suitable for the practice of this invention can be obtained by means of a nuclear reactor (pile) or by the use of natural or synthetic radioactive material, for example, cobalt 60.

Various types of high power electron linear accelerators are commercially available, for example, the ARCO type travelling wave accelerator, model Mark I, operating at 3 to 10 million electron volts, such as supplied by High Voltage Engineering Corporation, Burlington, Mass., or other types of accelerators as described in U.S. Pat. No. 2,763,609 and in British Pat. No. 762,953 are satisfactory for the practice of this invention.

The treatment by actinic light comprises subjecting the film to actinic light such as ultra-violet light. In general, the use of wave lengths in which sensitivity to actinic light occurs in approximately 1,800 to 4,000 angstrom units. Various suitable sources of the actinic light are available in the art including by way of example, quartz mercury lamps, ultra-violet cured carbon arcs and high-flash lamps.

The length of exposure in the actinic light and the intensity of the source may vary greatly. Generally, the first treatment should continue until all but the surface of the coating is substantially cured. The second treatment should continue, of course, until the entire coating is cured to a non-glossy surface.

The amount of ionizing irradiation employed in the first step is from about 0.2 megarad to about 20 megarads. Usually the total dosage is between about 0.2 megarad and about 10 megarads or more. A "rad" is defined as that amount of radiation required to supply 100 ergs per gram of material being treated, and a "megarad" is $10^6$ rads. The total dosage is the total amount of irradiation received by the material. It is desired to cure all the material with this first dosage except the surface of the material. The surface of the material will remain wet and uncured. The second ionizing irradiation treatment will complete the cure and form a non-glossy surface.

The first treatment of radiation is in an atmosphere of at least about 5,000 parts per million of oxygen. The most available atmosphere is, of course, air. However, any gaseous atmosphere containing the above proportion of oxygen is sufficient.

The irradiated material is then subjected to another dose of ionizing irradiation or actinic light. This treatment is in an inert atmosphere containing less than about 1,000 parts per million of oxygen. Often the inert atmosphere contains less than about 250 parts per million oxygen. The most readily available gaseous atmospheres are nitrogen gas, helium gas, and the like. As the surface of the material is wet prior to the second irradiation step, a cover blanket is not desirable.

The second radiation step requires about the same dosage as the first step. After the second irradiation step, the material will retain the strength properties of the material cured by the conventional radiation methods but will be flat or non-glossy in appearance.

The above method is particularly useful for coating substrates. The substrate may be coated with the radiation-sensitive material and then irradiated in air first and subsequently in an inert atmosphere.

Any conventional coating method may be used such as roll coating, spraying, dip coating and the like. A wide range of substrates may be coated such as paper, wood, glass, metals, plastics and the like. It is preferred to use substrates that are not degradable by ionizing irradiation or actinic light.

The invention is useful to produce strong films and coatings which have very low gloss. The need for flat coatings having great strength is found in aluminum sidings, strip coatings for residential use, interior wood coatings, and plastic products. As the coating or film is not glossy or shiny, the method herein is particularly desirable for those materials which need coatings for protection but which are more aesthetic when having a more subtle appearance.

The following examples set forth specific embodiments of the invention. However, the invention is not to be construed as being limited to these embodiments for there are, of course, numerous possible variations and modifications. All parts and percentages of the examples, as well as throughout the specification, are by weight unless otherwise indicated.

EXAMPLE 1

A panel of aluminum was coated with hexahydrophthalic ethylene glycol diacrylate coating formulation. The coated panel was subjected to ionizing irradiation from an electron beam in air. The coating received a total dosage of 3 megarads.

The coated panel was then subjected to ionizing irradiation by an electron beam in a nitrogen atmosphere having 80 parts per million of oxygen. The total dosage of this second treatment was 3 megarads.

The above coated panel was compared to a similar panel coated with hexahydrophthalic ethylene glycol diacrylate and subjected to 3 megarads in nitrogen only. The physical strength of the two coatings were equivalent but the gloss of the coating subjected to only one pass under the electron beam was 50 percent as measured by the 60° glossmeter and the gloss of the coating subjected to electron beam in air and then in nitrogen was only 5 percent.

The 60° glossmeter test is a standard test for gloss wherein light is reflected off the panel at a 60° angle and the percent reflectance is measured. The glossmeter test is a standard ASTM D523-67 test for evaluating gloss.

EXAMPLE 2

A panel of steel was coated with phthalic ethylene glycol diacrylate coating formulation. The coated panel was subjected to ionizing irradiation from an electron beam in air. The coating received a total dosage of 3 megarads.

The coated panel was then subjected to ionizing irradiation by an electron beam in a nitrogen atmosphere having 80 parts per million of oxygen. The total dosage of this second treatment was 3 megarads.

The above coated panel was compared to a similar panel coated with phthalic ethylene glycol diacrylate and subjected to 3 megarads in nitrogen only. The physical strength of the two coatings were equivalent but the gloss of the coating subjected to only one pass under the electron beam was 50 as measured by the 60° glossmeter and the gloss of the coating subjected to electron beam in air and then in nitrogen was only five.

EXAMPLE 3

A hardboard panel was coated with a composition comprising 71.6 parts of acryloxy pivalyl, acryloxy pivalate, 7.0 parts of ½ second cellulose acetate butyrate, 9.0 parts of silica pigment, 2 parts of diatomaceous earth pigment, 0.4 parts of microcrystalline wax, 6 parts of butyl acrylate, 4 parts of hydroxyethyl acrylate and 1 part of a mixture of benzoin butyl ether and benzoin amyl ether to a thickness of 1 mil using a curtain coater. The coated panel was then subjected to ultra-violet light using a 330 watts per inch mercury bulb at a distance of 3 inches from the coating at a line speed of 100 feet per minute in air. The coating was subjected to 2 passes.

The coating was then subjected to a second ultra-violet light treatment using a 200 watts per inch mercury bulb at a distance of 6 inches from the coating and at a line speed of 30 feet per minute for one pass. This treatment was performed in a nitrogen gas atmosphere containing less than 200 parts per million of oxygen. The coating had good adhesion and was found to be resistant to staining by naphtha, water, isopropyl alcohol, acetone, ammonia, coffee, tea, mustard and many other materials which typically stain coatings.

The coating was then tested for gloss using the 60° glossmeter test and compared to the same coating which has only been subjected to the ultra-violet treatment in nitrogen. The coating subjected to the dual cure in air and then nitrogen had a gloss of only 10 percent while the coating subjected to the conventional cure had a gloss of 50 percent.

EXAMPLE 4

A hardboard panel was coated with a composition comprising 82.38 parts of acryloxy pivalyl acryloxy pivalate, 5.73 parts of ½ second cellulose acetate butyrate, 9.91 parts of silica pigment, and 0.99 part of a mixture of benzoin, butyl ether and benzoin amyl ether to a thickness of 1 mil using a curtain coater. The coated panel was then subjected to ultra-violet light using a 200 watts per inch mercury bulb at a distance of 5 inches from the coating at a line speed of 86 feet per minute in air. The coating was subjected to two passes.

The coating was then subjected to a second ultra-violet light treatment using a 200 watts per inch mercury bulb at a distance of 6 inches from the coating and at a line speed of 100 feet per minute for one pass. This treatment was prepared in a nitrogen gas atmosphere containing less than 150 parts per million of oxygen. The coating had good adhesion and was found to be resistant to stains.

The coating was then tested for gloss using the 60° glossmeter test and compared to the same coating which has only been subjected to the ultra-violet treatment in nitrogen. The coating subjected to the dual cure in air and then nitrogen had a gloss of only 40 percent while the coating subjected to the conventional cure had a gloss of 65 percent.

EXAMPLES 5–7

An unsaturated polyester resin prepared by thinning 75 parts of a polyester comprising 8.1 moles of propylene glycol, 2.8 mols of diethylene glycol, 4.0 mols of maleic anhydride, and 6.0 mols of phthalic anhydride with 25 parts of 2-ethyl hexyl acrylate was pigmented with 0 percent, 3 percent, and 12 percent by weight of silica flatting pigment to show the effect of the flatting pigments on gloss.

Aluminum panels were coated with 2 mils of the coatings and one set was cured by electron beam impingement at a total dosage of 3 megarads in air and subsequently with 3 megarads in a nitrogen gas atmosphere and another set subjected only to 3 megarads in nitrogen. The results of the 60° glossmeter test are as follows:

| Example | % Pigment | Cure | % Gloss |
|---|---|---|---|
| 5 | 0 | Nitrogen | 86 |
| Control A | 0 | Air-nitrogen | 70 |
| 6 | 3 | Nitrogen | 81 |
| Control B | 3 | Air-nitrogen | 54 |
| 7 | 12 | Nitrogen | 40 |

-continued

| Example | % Pigment | Cure | % Gloss |
|---|---|---|---|
| Control C | 12 | Air-nitrogen | 4 |

It is seen that without pigment a significant reduction in gloss is obtained using the dual cure technique and with flatting pigments the gloss is further reduced.

According to the provisions of the patent statutes, there is described above the invention and what are now considered to be its best embodiments. However, within the scope of the appended claims, it is to be understood that the invention can be practiced otherwise than as specifically described.

I claim:

1. The method of obtaining a strong, non-glossy film comprising subjecting substantially solventless, radiation-sensitive or actinic light sensitive material to ionizing irradiation or actinic light in an atmosphere containing at least about 5,000 parts per million of oxygen until the material is cured except for its surface, and subsequently subjecting the material to ionizing irradiation or actinic light in an inert atmosphere containing less than about 1000 parts per million of oxygen.

2. The method of claim 1 wherein the total dosage of irradiation received in the atmosphere containing greater than 5,000 parts per million of oxygen is from about 0.2 megarads to about 20 megarads.

3. The method of claim 1 wherein the total dosage of irradiation received in the atmosphere containing less than about 1000 parts per million of oxygen is from about 0.2 megarads to about 20 megarads.

4. The method of claim 1 wherein the radiation treatment is actinic light.

5. The method of claim 1 wherein the radiation-sensitive material contains a polyacrylate.

6. The method of claim 1 wherein the radiation-sensitive material contains an unsaturated polyester resin.

7. The method of coating a substrate with a non-glossy coating comprising applying to the substrate a substantially solventless, radiation-sensitive material and subjecting to ionizing irradiation or actinic light in an atmosphere of at least about 5,000 parts per million of oxygen until the radiation-sensitive material is cured except for its surface and subsequently subjecting the radiation-sensitive coating to ionizing irradiation or actinic light in an inert atmosphere containing less than about 1000 parts per million of oxygen.

8. The method of claim 7 wherein the total dosage of irradiation received in the atmosphere containing greater than 5,000 parts per million of oxygen is from about 0.2 to about 20 megarads.

9. The method of claim 7 wherein the total dosage of irradiation received in the atmosphere containing less than about 1000 parts per million of oxygen is from about 0.2 to about 20 megarads.

10. The method of claim 7 wherein the radiation treatment is actinic light.

11. The method of claim 7 wherein the radiation-sensitive material contains a polyacrylate.

12. The method of claim 7 wherein the radiation-sensitive material contains an unsaturated polyester resin.

13. The film formed by the method of claim 1.

14. The coated material formed by the method of claim 7.

15. The method of radiation curing a layer of a radiation curable composition to obtain a low gloss surface comprising:
a. subjecting said layer of radiation curable composition to irradiation in the form of
   1. high energy ionizing radiation, or
   2. actinic light radiation while said layer is in contact at one surface with an air or oxygen-containing atmosphere to partially cure said composition; then
b. subjecting said layer to said irradiation while said layer is in contact at said surface with an inert or substantially oxygen free atmosphere to complete the curing of said composition;
c. said substantially oxygen free atmosphere being an atmosphere such that any oxygen present as a trace amount is insufficient to inhibit free radical cure of said composition.

* * * * *